(12) United States Patent
Inazaki et al.

(10) Patent No.: US 11,268,572 B2
(45) Date of Patent: Mar. 8, 2022

(54) ROLLING SLIDE MEMBER, ROLLING BEARING USING SAME, AND METHOD FOR MANUFACTURING ROLLING SLIDE MEMBER

(71) Applicants: JTEKT CORPORATION, Osaka (JP); DAIDO STEEL CO., LTD., Nagoya (JP)

(72) Inventors: Nao Inazaki, Okazaki (JP); Fumihiro Furukawa, Nagoya (JP); Kanji Kawasaki, Oume (JP); Hisato Nishisaka, Kashiwara (JP); Tomoya Hattori, Kashiba (JP); Kazuhisa Kitamura, Kashihara (JP); Yusuke Kusafuka, Nagoya (JP); Keita Hinoshita, Nagoya (JP); Hiroyuki Takabayashi, Nagoya (JP); Kazuhisa Ishida, Osaka (JP)

(73) Assignees: JTEKT CORPORATION, Osaka (JP); DAIDO STEEL CO., LTD., Nagoya (JP)

( * ) Notice: Subject to any disclaimer, the term of this patent is extended or adjusted under 35 U.S.C. 154(b) by 113 days.

(21) Appl. No.: 16/680,868

(22) Filed: Nov. 12, 2019

(65) Prior Publication Data
US 2020/0080594 A1    Mar. 12, 2020

Related U.S. Application Data

(62) Division of application No. 15/999,613, filed as application No. PCT/JP2017/005394 on Feb. 15, 2017.

(30) Foreign Application Priority Data

Feb. 19, 2016   (JP) .............................. JP2016-030498

(51) Int. Cl.
  *F16C 33/62*   (2006.01)
  *F16C 19/06*   (2006.01)
  (Continued)

(52) U.S. Cl.
  CPC .............. *F16C 33/62* (2013.01); *C21D 1/773* (2013.01); *C21D 6/002* (2013.01); *C21D 6/004* (2013.01);
  (Continued)

(58) Field of Classification Search
  CPC .......... F16C 33/64; F16C 33/62; F16C 33/38; F16C 2204/70; F16C 2204/74;
  (Continued)

(56) References Cited

U.S. PATENT DOCUMENTS

| 5,672,014 A | 9/1997 | Okita et al. |
| 2005/0207687 A1 | 9/2005 | Fujita et al. |

(Continued)

FOREIGN PATENT DOCUMENTS

| CN | 101158011 A | 4/2008 |
| CN | 102498227 A | 6/2012 |

(Continued)

OTHER PUBLICATIONS

Machine Translation of JP 2007-277639 (Year: 2007).*
(Continued)

*Primary Examiner* — Christopher J Besler
(74) *Attorney, Agent, or Firm* — Oliff PLC

(57) ABSTRACT

A rolling-sliding member that is high in hardness and continues to have a passivation film reliably even after being subjected to a process that does not require any processing for removal of scale, etc., as well as a rolling bearing using the same and a method for manufacturing the rolling-sliding member.

2 Claims, 3 Drawing Sheets

(51) Int. Cl.
| | |
|---|---|
| *F16C 33/64* | (2006.01) |
| *F16C 33/38* | (2006.01) |
| *C21D 9/40* | (2006.01) |
| *C22C 38/54* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/46* | (2006.01) |
| *C22C 38/60* | (2006.01) |
| *C21D 6/00* | (2006.01) |
| *C21D 1/773* | (2006.01) |

(52) U.S. Cl.
CPC ............. *C21D 6/005* (2013.01); *C21D 6/008* (2013.01); *C21D 9/40* (2013.01); *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/54* (2013.01); *C22C 38/60* (2013.01); *F16C 19/06* (2013.01); *F16C 33/64* (2013.01); *F16C 33/38* (2013.01); *F16C 2202/04* (2013.01); *F16C 2204/62* (2013.01); *F16C 2204/64* (2013.01); *F16C 2204/70* (2013.01); *F16C 2204/72* (2013.01); *F16C 2204/74* (2013.01); *F16C 2326/01* (2013.01)

(58) Field of Classification Search
CPC ............... F16C 2204/62; F16C 2204/72; F16C 2204/64; F16C 2202/04; F16C 2326/01; F16C 19/06; B23P 15/003
See application file for complete search history.

(56) References Cited

U.S. PATENT DOCUMENTS

| | | | |
|---|---|---|---|
| 2008/0089804 | A1 | 4/2008 | Ishikawa et al. |
| 2012/0177527 | A1 | 7/2012 | Kerrigan et al. |
| 2015/0049972 | A1* | 2/2015 | Sasaki ............... F16C 19/06 |
| | | | 384/484 |
| 2016/0289785 | A1 | 10/2016 | Matsuzawa et al. |

FOREIGN PATENT DOCUMENTS

| | | |
|---|---|---|
| JP | 2001-049277 A | 2/2001 |
| JP | 2004-205047 A | 7/2004 |
| JP | 2007-277639 A | 10/2007 |
| JP | 4952888 B2 | 6/2012 |
| JP | 2015-094015 A | 5/2015 |
| WO | WO-2013108672 A1 * | 7/2013 .......... F16C 33/7846 |

OTHER PUBLICATIONS

May 16, 2017 International Search Report issued in International Patent Application No. PCT/JP2017/005394.
May 16, 2017 Written Opinion issued in International Patent Application No. PCT/JP2017/005394.
Sep. 7, 2020 Office Action issued in Chinese Patent Application No. 201780011990.0.
Renkui He and Shu Liu, "Engineering Materials and Heat Treatment [M]," p. 94, published in 2015.
Jun. 12, 2020 Office Action issued in U.S. Appl. No. 15/999,613.
Jan. 26, 2021 Office Action issued in U.S. Appl. No. 15/999,613.
Mar. 13, 2020 Office Action issued in Chinese Patent Application No. 201780011990.0.
Sep. 1, 2021 Office Action issued in Chinese Patent Application No. 201780011990.0.
Chapter 16, "Gear Material and Heat Treatment," Part II of Modern Mechanical Transmission Manual, pp. 540-545, published by Machinery Industry Press, Apr. 1995.

* cited by examiner

ROLLING SLIDE MEMBER, ROLLING BEARING USING SAME, AND METHOD FOR MANUFACTURING ROLLING SLIDE MEMBER

RELATED APPLICATIONS

The present application is a divisional application of U.S. application Ser. No. 15/999,613 filed Aug. 20, 2018, which in turn is a U.S. national stage application of PCT/JP2017/005394 filed Feb. 15, 2017. Each of these prior applications is incorporated herein by reference in its entirety.

TECHNICAL FIELD

The present invention relates to a rolling-sliding member, a rolling bearing using the same, and a method for manufacturing a rolling-sliding member.

BACKGROUND ART

Rolling bearings are used broadly in various fields. For example, in vehicle slide doors, rolling bearings (roller bearings) are used so that a slide door can be opened and closed smoothly along a slide rail that is provided on each side of a vehicle body. Rolling bearings are also used in slide doors of industrial machines, warehouses, etc. Rolling bearings for a slide door need to be high in strength so as to be able to support the weight of the slide door and not to be damaged or deformed by, for example, an impact load occurring when the door is opened or closed. Conventionally, rolling bearings of this type employ SUS440C which is of a martensite type and belongs to a class that is highest in hardness among stainless steels.

Incidentally, slide rails of a slide door may be installed in such a state as to be exposed directly to an external environment (ambient atmosphere). In this case, rolling bearings are also required to be high in corrosion resistance because they are put in such an exposed-to-water environment as to be easily exposed to a cleaning liquid for vehicle washing, an aqueous solution of calcium chloride of an anti-freezing agent, etc. Although SUS440C is high in hardness, it is at a low level in corrosion resistance among stainless steels. As a result, use of rolling bearings made of SUS440C in an exposed-to-water environment is associated with a problem that they are prone to rust.

Patent document 1 discloses a martensite-type stainless steel that is high in hardness and corrosion resistance and hence can be used suitably to form a bearing. In Patent document 1, the hardness is increased by setting the content of N higher than in conventional martensite-type stainless steels and optimizing the total content of C and N and the content ratio C/N. On the other hand, the corrosion resistance is increased by adding a corrosion resistance increasing element such as Mo and adding a proper amount of N in the matrix in the form of a solid solution.

BACKGROUND ART DOCUMENT

Patent Document

Patent document 1: Japanese Patent No. 4,952,888

SUMMARY OF THE INVENTION

Problems that the Invention is to Solve

Exhibiting high hardness and corrosion resistance, the martensite-type stainless steel disclosed in Patent document 1 is certainly suitable for formation of a bearing. However, in manufacturing, for example, the outer ring of a rolling bearing using this stainless steel, it is turned on a lathe into a ring having predetermined dimensions and then subjected to heat treatment to secure certain hardness. Usually, this heat treatment is performed in air (oxygen-containing atmosphere). Thus, oxygen in the air reacts with iron in the surface of the stainless steel, whereby an iron-oxide-based coating (what is called scale) is formed. The scale is a coating that is not necessary in a product and hence scale removal processing is necessary, which is cumbersome.

Furthermore, in the heat treatment in air, the contents of the component vary as exemplified by increase of the content of N (nitrogen absorption) and decrease of the content of C (decarburization) in, for example, a region to a depth of 0.7 mm from the surface of the stainless steel. In removing scale, removal processing (referred to as "processing for removal of scale etc." which includes scale removal processing and processing for removal of portions where the content variations have occurred) needs to be performed taking into consideration removal of portions where content variations such as nitrogen absorption and decarburization have occurred. Thus, in the processing for removal of scale etc., a portion to the depth of about 1 mm from the surface needs to be removed to prevent scale, a nitrogen absorption region, and a decarburization region from remaining. As such, the processing for removal of scale etc. causes a large material loss.

One method for preventing formation of scale, a nitrogen absorption region, and a decarburization region by heat treatment would be to perform heat treatment in, for example, a vacuum atmosphere (oxygen-absent atmosphere). If heat treatment is performed in a vacuum atmosphere, none of scale, a nitrogen absorption region, and a decarburization region are formed and hence no processing for removal of scale etc. is necessary. However, a problem arises that heat treatment in a vacuum atmosphere causes formation of rust on the surface (i.e., the corrosion resistance lowers) even if a stainless steel that exhibits high corrosion resistance is used. As for this problem, in Patent document 1, no attention is paid to omission of the processing for removal of scale etc. and no countermeasure against lowering of corrosion resistance due to this is taken.

The present inventors have studied diligently to investigate the cause of the above problems and have found first that shortage of Cr in a very thin, nano-level surface layer part having a depth of several tens of nanometers from the surface renders formation of an effective passivation film difficult.

The present invention has been made to solve the above problems, and an object of the present invention is therefore to provide a rolling-sliding member that is high in hardness and continues to have a passivation film reliably even after being subjected to a process that does not require any processing for removal of scale etc., as well as a rolling bearing using the same and a method for manufacturing the rolling-sliding member.

Means for Solving the Problems

Firstly, the present invention provides a rolling-sliding member including: 0.15 mass % or larger and smaller than 0.70 mass % of C; 0.05 to 1.00 mass % of Si; 0.05 to 1.00 mass % of Mn; 0.03 mass % or smaller of P; 0.03 mass % or smaller of S; 0.001 to 0.500 mass % of Cu; 0.05 to 0.50 mass % of Ni; 11.0 to 18.0 mass % of Cr; 0.05 to 2.00 mass % of Mo; 0.01 to 0.50 mass % of W; 0.01 to 0.50 mass % of V; 0.05 to 0.40 mass % of N; 0.02 mass % or smaller of O; 0.080 mass % or smaller of Al; 0.0005 to 0.0050 mass % of B; provided that the total content of C and N is larger than 0.4 mass % and smaller than 0.7 mass %, and a content ratio C/N is 0.75 or larger; and the remainder being Fe and unavoidable impurities, in which no Cr-deficient layer exists in a surface layer part having a depth of at least 40 nm from a surface of the rolling-sliding member.

The fundamental composition of this rolling-sliding member is the same as that disclosed in Patent document 1. With the additional feature that no Cr-deficient layer exists in a surface layer part, the rolling-sliding member has a passivation film reliably even if it is manufactured by a process that does not require any processing for removal of scale etc. As a result, high hardness and corrosion resistance can be secured.

The rolling-sliding member according to the present invention means a metal member having a contact surface that comes into relative rolling contact or sliding contact with a counterpart member. Specific examples of the rolling-sliding member are constituent members of a rolling bearing, a linear bearing, and a ball screw. The linear bearing is a bearing in which a first raceway member and a second raceway member that have respective straight raceway surfaces and are opposed to each other make straight movement relative to each other with rolling of a plurality of rolling bodies disposed between the first raceway member and the second raceway member. Examples of the rolling bodies used in the linear bearing are balls and rollers. Another type of the linear bearing is a recirculating linear bearing in which rolling bodies circulate. The ball screw is a bearing in which each of confronting surfaces of a screw shaft and a nut is formed with a screw groove in which balls (a plurality of rolling bodies) are disposed rollably.

The rolling bearing includes an outer ring, an inner ring, a plurality of rolling bodies disposed rollably between the outer ring and the inner ring, and a holding device which holds the plurality of rolling bodies so that the plurality of rolling bodies are arranged at predetermined intervals in the circumferential direction. It is most preferable to use the rolling-sliding member according to the present invention as the outer ring of a rolling bearing among the above-mentioned various rolling-sliding members. This is because although the inner ring, the rolling bodies, and the holding device are also rolling-sliding members, the outer ring is the outermost component of the rolling bearing and hence is most prone to rust when put in an exposed-to-water environment and exposed to water, a salt content, or the like.

Additionally, the present invention also provides a method for manufacturing a rolling-sliding member, the method including: performing vacuum heat treatment, to attain hardness of 55 HRC or higher, on a martensite steel member including: 0.15 mass % or larger and smaller than 0.70 mass % of C; 0.05 to 1.00 mass % of Si; 0.05 to 1.00 mass % of Mn; 0.03 mass % or smaller of P; 0.03 mass % or smaller of S; 0.001 to 0.500 mass % of Cu; 0.05 to 0.50 mass % of Ni; 11.0 to 18.0 mass % of Cr; 0.05 to 2.00 mass % of Mo; 0.01 to 0.50 mass % of W; 0.01 to 0.50 mass % of V; 0.05 to 0.40 mass % of N; 0.02 mass % or smaller of O; 0.080 mass % or smaller of Al; 0.0005 to 0.0050 mass % of B; provided that the total content of C and N is larger than 0.4 mass % and smaller than 0.7 mass %, and a content ratio C/N is 0.75 or larger; and the remainder being Fe and unavoidable impurities; and thereafter performing processing of removing a surface layer part of the martensite steel member.

In the above manufacturing method, a region of performing the processing of removing the surface layer part may be a region having a depth of at least 40 nm from a surface of the martensite steel member. This is because a Cr-deficient layer tends to be formed in a region having a depth of 40 nm from the surface in the case where vacuum heat treatment is performed to dispense with the processing for removal of scale etc. Thus, reduction of corrosion resistance can be prevented effectively by removing the region having a depth of at least 40 nm from the surface.

In the case where this rolling-sliding member is used as the outer ring of a rolling bearing, it suffices that the processing of removing a surface layer part be performed on at least the outer circumferential surface and the side surfaces of the outer ring. That is, the processing of removing a surface layer part need not always be performed on the inner surface of the outer ring. This is because, in the case where the raceways of the rolling bearing are sealed by sealing members, water is not prone to intrude to reach the raceways, and hence formation of rust is hardly caused on the inner surface, formed with the raceway, of the outer ring.

In the present invention, an expression "AA to BB" indicating a numerical range means "larger (or higher) than or equal to AA and smaller (or lower) than or equal to BB" unless otherwise specified.

Advantage of the Invention

Being the same in fundamental composition as the rolling-sliding member disclosed in Patent document 1, the rolling-sliding member according to the present invention exhibits high hardness and corrosion resistance intrinsically. With the additional feature that no Cr-deficient layer exists in a surface layer part, the rolling-sliding member has a passivation film reliably. Thus, even if it is manufactured by a process that does not require any processing for removal of scale etc., it does not have an iron-based coating as formed due to presence of a Cr-deficient layer. High corrosion resistance can therefore be secured. Thus, rust can be prevented effectively even if the rolling-sliding member is used as the outer ring of a rolling bearing that is used in an exposed-to-water environment. As a result, the rolling-sliding member can be used in seaside areas where the salt concentration in the air is high and conventional rolling-sliding members are difficult to use.

In the method for manufacturing a rolling-sliding member according to the present invention, none of scale, nitrogen absorption region, and decarburization region are formed because the heat treatment is performed in a vacuum atmosphere (oxygen-absent atmosphere). Thus, it is not necessary to perform, after the heat treatment, any processing for removal of scale etc., which is indispensable conventionally. With the additional feature that the processing of removing a surface layer part is performed, a Cr-deficient layer that is formed by the vacuum heat treatment can be removed. Since it suffices that the processing of removing a surface layer part be performed in nm order, the amount of removed material is extremely smaller than in the processing for removal of scale etc. in which a surface layer part is removed in mm order. This processing of removing a surface layer part is therefore advantageous also in terms of material cost. Furthermore, since the cycle time of removal processing is proportional to the amount of removed material, the shortening of the cycle time can increase the yield per unit time.

MODE FOR CARRYING OUT THE INVENTION

Figure 1:
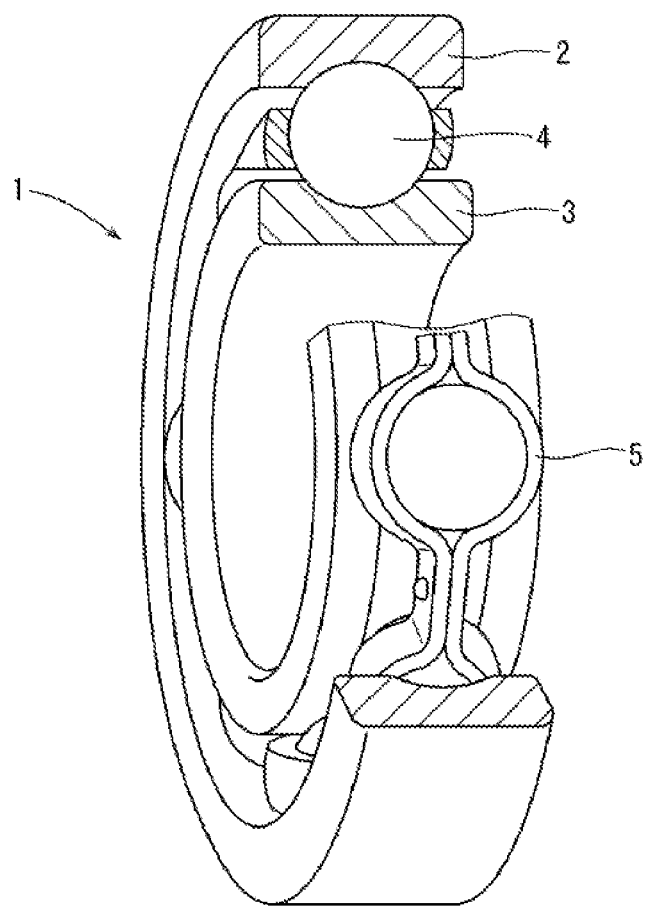
FIG. 1 is a partially cutaway perspective view showing the structure of a common rolling bearing.

First, a description will be made of a fundamental composition of a martensite steel material that is a base of a rolling-sliding member. This rolling-sliding member is the same in fundamental composition as the rolling-sliding member disclosed in Patent document 1, and has DSR-40N as a product on the market. More specifically, the fundamental composition includes 0.15 mass % or larger and smaller than 0.70 mass % of C; 0.05 to 1.00 mass % of Si; 0.05 to 1.00 mass % of Mn; 0.03 mass % or smaller of P; 0.03 mass % or smaller of S; 0.001 to 0.500 mass % of Cu; 0.05 to 0.50 mass % of Ni; 11.0 to 18.0 mass % of Cr; 0.05 to 2.00 mass % of Mo; 0.01 to 0.50 mass % of W; 0.01 to 0.50 mass % of V; 0.05 to 0.40 mass % of N; 0.02 mass % or smaller of O; 0.080 mass % or smaller of Al; 0.0005 to 0.0050 mass % of B; provided that the total content of C and N is larger than 0.4 mass % and smaller than 0.7 mass %, and a content ratio C/N is 0.75 or larger; and the remainder being Fe and unavoidable impurities.

Carbon (C) serves to secure necessary strength and corrosion resistance, and forms carbides by combining with carbide forming elements such as Cr, Mo, W, V, and Nb. Carbon also serves to secure necessary hardness by forming a solid solution in the matrix at the time of quenching, thereby causing the matrix to have a martensite structure.

Being an interstitial element, N increases both of corrosion resistance and hardness. The corrosion resistance is increased when N is added to the matrix in the form of a solid solution. The elements Ni, Cr, and V increase the amount of dissolved nitrogen.

Chromium (Cr), which is the main component of a surface layer passivation film, increases the corrosion resistance. Copper (Cu) also increases the corrosion resistance, and is particularly effective at suppressing erosion of hydrochloric acid. Molybdenum (Mo) also increases the corrosion resistance.

Silicon (Si) is added mainly as a deoxidizer or for addition of nitrogen. Manganese (Mn) increases the quenching performance, and has an effect of preventing reduction in toughness by fixing S that is contained unavoidably. Tungsten (W) increases the quenching performance. Aluminum (Al) is added as a deoxidizer. Boron (B) strengthens grain boundaries and thereby lowers the probability of occurrence of braking at the time of quenching or sub-zero treatment. Phosphorus (P), S, and O are contained in steel unavoidably.

The rolling-sliding member may contain the following elements in the following content ranges in addition to the above essential elements:

0.001 mass %≤Co≤0.500 mass %
0.001 mass %≤Se≤0.300 mass %
0.001 mass %≤Te≤0.300 mass %
0.0002 mass %≤Ca≤0.1000 mass %
0.001 mass %≤Pb≤0.200 mass %
0.001 mass %≤Nb≤0.300 mass %
0.001 mass %≤Ta≤0.300 mass %
Ti≤0.200 mass %
0.001 mass %≤Zr≤0.300 mass %.

In the case of manufacturing a rolling-sliding member using the above martensite steel material, the material is formed into a predetermined shape by casting or forging and then subjected to heat treatment such as quenching, sub-zero treatment, and tempering to obtain certain hardness and for other purposes. In the case where high dimensional accuracy is required, it is preferable to cut a member formed by casting or forging so as to have a rough shape, into predetermined dimensions.

The quenching treatment is performed by heating a steel material to a quenching temperature or a solution treatment temperature of 1,020° C. to 1,150° C. and then cooling it quickly at a predetermined cooling rate by oil quenching, gas cooling, or the like. In the sub-zero treatment, the steel material is again cooled quickly using a freezing mixture or refrigerant of 0° C. or lower soon after the quenching. For example, dry ice, dry ice plus alcohol (−80° C.), carbon dioxide gas (−130° C.), or liquid nitrogen (−196° C.) can be used as the freezing mixture or refrigerant. In the tempering treatment, the steel material as subjected to the sub-zero treatment is heated to 150° C. to 450° C. As a result of the above heat treatment, the steel material is given Rockwell hardness that is at least larger than or equal to 55 HRC, which is equivalent to the value of SUS440C.

The heat treatment described above is performed in a vacuum atmosphere. It is also preferable to perform the heat treatment in an inert gas atmosphere by introducing a nitrogen gas or the like, rather than in a vacuum atmosphere. Since the above heat treatment is performed in an oxygen-absent atmosphere, no scale, nitrogen absorption region, or decarburization region is formed in the surface of the rolling-sliding member and hence it is not necessary to perform any processing for removal of scale etc. after the heat treatment.

However, we found that a Cr-deficient layer where the content of Cr is clearly small is formed within a region of a depth (thickness) of about 40 nm from the surface. Thus, if the steel material is used without being subjected to any processing after the heat treatment, no effective passivation film is formed due to the shortage of Cr and an iron oxide coating is formed instead as a result of a phenomenon that iron in the steel material combines with oxygen in the air, resulting in large reduction in corrosion resistance. The term "Cr-deficient layer" as used herein means a layer where the content of Cr is clearly smaller than an intrinsic range 11.0 to 18.0 mass % of the rolling-sliding member.

In view of the above, it is necessary to remove a very thin surface layer part after the heat treatment. The thickness (depth) of a layer to be removed is at least larger than or equal to 40 nm, preferably larger than or equal to 100 nm, from the surface. A clear Cr-deficient layer can be removed properly if a layer whose thickness is larger than or equal to 40 nm from the surface is removed. A Cr-deficient layer can be removed fully if a layer whose thickness is larger than or equal to 100 nm from the surface is removed. On the other hand, although there are no particular limitations on the upper limit of the thickness of a layer to be removed, it is preferable that the upper limit be at least smaller than a thickness (0.7 mm) of the conventional processing for removal of scale etc. This is because it is desirable to reduce the amount of removed material to a minimum necessary level if the material cost and the productivity (shortening of the processing time) are taken into consideration. Thus, it is much preferable that the thickness of a layer to be removed be smaller than or equal to 100 μm from the surface and it is far preferable that it be smaller than or equal to 150 nm from the surface. There are no particular limitations on the processing method for removing a surface layer part; any method capable of removing a surface layer part can be employed, such as polishing, barrel polishing, cutting, and chemical processing.

A rolling-sliding member produced in the above-described manner is high in corrosion resistance because an effective passivation film is formed reliably in the surface thereof. In terms of pitting potential, this rolling-sliding member is equivalent to SUS630 which is said to be high in corrosion resistance. As such, this rolling-sliding member is suitable as a member for use in an exposed-to-water environment, and can be used as a rolling bearing used for, for example, a slide door that is installed in an automobile, an industrial machine, a warehouse, or the like so as to be exposed directly to an external environment (ambient atmosphere). This rolling-sliding member is particularly suitable for use as the outer ring of a rolling bearing among such uses.

As shown in FIG. 1, a common rolling bearing 1 of this type includes an outer ring 2, an inner ring 3, a plurality of rolling bodies 4 which are disposed rollably between the outer ring 2 and the inner ring 3, and a holding device 5 for holding the rolling bodies 4 so that the rolling bodies 4 are arranged at predetermined intervals in the circumferential direction. Since in this manner the outer ring 2 is the outermost component of the rolling bearing 1, it is most prone to rust when the rolling bearing 1 is used in an exposed-to-water environment. If the outer ring 2 rusts, resulting rust powder sticks to a slide rail and possibly impair its appearance. It is therefore preferable to use the rolling-sliding member according to the present invention as the outer ring 2.

Figure 2:
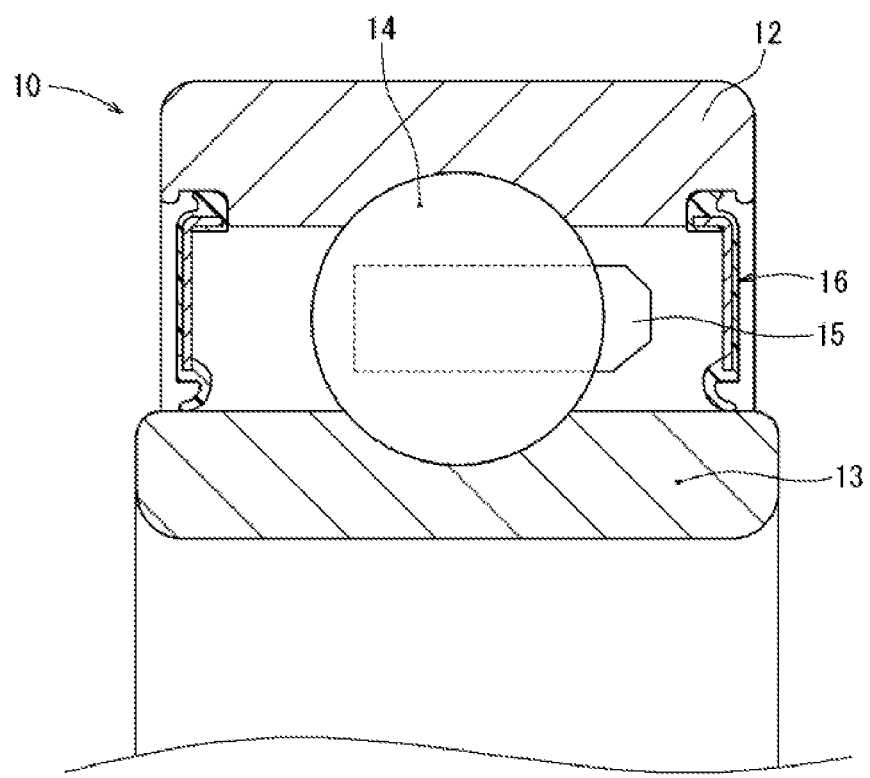
FIG. 2 is a sectional view of a rolling bearing that has a sealing member for sealing drive surfaces.

In this case, basically, it is necessary to perform processing of removing a Cr-deficient layer on all of the outer circumferential surface, the side surfaces, and the inner circumferential surface (the surface opposed to the inner ring 3) of the outer ring 2. However, among rolling bearings are ones in which, as in a rolling bearing 10 for a slide door shown in FIG. 2, the space between an outer ring 12 and an inner ring 13 is sealed by sealing members 16. In the rolling bearing 10 having such a structure, it may suffice to perform processing of removing a Cr-deficient layer on only the outer circumferential surface and the side surfaces of the outer ring 2. In FIG. 2, symbol 14 denotes a rolling body and symbol 15 denotes a holding device for holding the rolling bodies 14 at predetermined intervals in the circumferential direction.

In this rolling bearing 10 for a slide door, in many cases, the inner circumferential surface, including the raceway surface, of the outer ring 12 is not subjected to finishing such as polishing after being subjected to cutting and vacuum heat treatment as in the conventional case. More specifically, in the common rolling bearing 1, it is found frequently that finishing is performed on only the raceway surface (inner circumferential surface) which is a curved surface but is not performed on the side surfaces and the outer circumferential surface. On the other hand, in the present invention, finishing is performed on only the side surfaces or the outer circumferential surface but not performed on the raceway surface; the present invention is right opposite to the conventional case in this respect. Thus, in such a rolling bearing 10 for a slide door, the time and labor and the cost of processing can be reduced.

In the case where rolling bearings are used in an exposed-to-water environment, the inner ring may also rust. It is therefore preferable to use a rolling-sliding member according to the present invention also as the inner ring. As in the case of the outer ring, basically, it is preferable to perform processing of removing a Cr-deficient layer on all of the outer circumferential surface (the surface opposed to the outer ring), the side surfaces, and the inner circumferential surface. However, in the case shown in FIG. 2 in which the space between the outer ring and the inner ring is sealed by the sealing members, the processing of removing a Cr-deficient layer may be performed on only the inner circumferential surface and the side surfaces.

The rolling bodies and the holding device may be made of the same materials as those of known, common rolling bearings. For example, the rolling bodies may be made of a carbon steel or SUJ2. For example, the holding device may be made of a resin-based material such as reinforced polyamide.

EXAMPLES

Hardness (Rockwell hardness) of the outer rings of rolling bearings that were treated under various sets of heat treatment conditions shown in Table 1 was measured and evaluated. Results are also shown in Table 1. As for the dimensions of the outer ring, the outer diameter was 24 mm, the inner diameter was 18 mm, and the width was 8 mm. DSR-40N was used as a martensite steel material. The outer ring was produced by cutting a rod material without subjecting a resulting material to processing of removing a surface layer such as polishing. Heat treatment was performed using a vacuum furnace. Quick cooling that was performed after quenching was carried out by introducing a nitrogen gas into the furnace.

TABLE 1

| | | Manufacture Example 1 | Manufacture Example 2 | Manufacture Example 3 | Manufacture Example 4 | Manufacture Example 5 | Manufacture Example 6 |
|---|---|---|---|---|---|---|---|
| Quenching | Temperature (° C.) | 1,062 | 1,038 | 1,050 | 1,050 | 1,050 | 1,050 |
| | Time (min) | 70 | 50 | 60 | 60 | 60 | 60 |
| Sub-zero treatment | Temperature (° C.) | −60 | −60 | −72 | −48 | −60 | −60 |
| | Time (min) | 30 | 30 | 40 | 20 | 30 | 30 |
| Tempering | Temperature (° C.) | 180 | 180 | 180 | 180 | 192 | 168 |
| | Time (min) | 120 | 120 | 120 | 120 | 130 | 110 |
| | Hardness (HRC) | 58.2 | 57.3 | 57.9 | 57.3 | 57.1 | 58.4 |

It was confirmed from the results of Table 1 that the Rockwell hardness can be made larger than or equal to 55 HRC by performing vacuum heat treatment on DSR-40N under the above sets of heat treatment conditions.

Subsequently, influence of execution/non-execution of the surface layer part removal processing on the corrosion resistance was measured and evaluated using the outer ring of Manufacture Example 1. The outer ring of Manufacture Example 1 whose outer circumferential surface was subjected to the surface layer part removal processing by polishing away a surface layer part having a depth of 100 μm from the surface was employed as Working Example. On the other hand, the outer ring of Manufacture Example 1 itself that was not subjected to the surface layer part removal processing was employed as Comparative Example. As for corrosion resistance, pitting potential was measured according to JIS G 0577: 2014. The contents of JIS G 0577: 2014 are incorporated herein by reference.

A measured pitting potential of Working Example (with surface layer part removal) was 116 mV, which is equivalent to the value of SUS630 which is generally said to be high in corrosion resistance. In contrast, a measured pitting potential of Comparative Example was −12 mV. Thus, whereas in Comparative Example (without surface layer part removal) proper corrosion resistance cannot be obtained though it is high in hardness, it was confirmed that in Example (with surface layer part removal) both of high hardness and high corrosion resistance are secured.

Subsequently, why execution/non-execution of the surface layer part removal causes a difference in corrosion resistance was investigated. In the investigation, an element composition profile in the depth direction was analyzed using an Auger electron spectroscopic analyzer by repeating, starting from the outermost surface layer part, an element composition analysis and nm-order removal of a material layer by ion sputtering. The depth was obtained by converting the ion sputtering time. Results are shown in FIG. 3.

Figure 3:
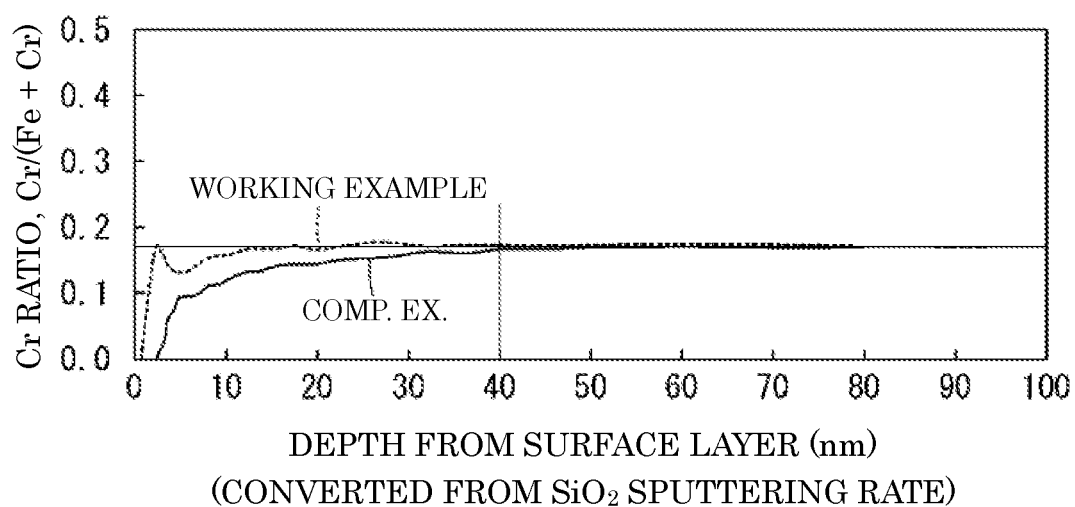
FIG. 3 is a graph showing to what extent Cr exists in a surface layer part.

It is seen from the results shown in FIG. 3 that in Comparative Example (without surface layer part removal), the Cr ratio clearly is smaller in a region having a depth of about 40 nm from the surface (i.e., Cr-deficient region) than a reference (constant) Cr ratio in a region where the depth is around 100 nm. Thus, it was found that the reason of the corrosion resistance reduction is that no effective passivation film is formed adjacent to the surface. It is seen from the above measurement result that it suffices that the thickness (depth) of a layer to be removed be at least larger than or equal to 40 nm from the surface in the surface layer part removal processing. That is, it is expected that a state that the Cr ratio is constant from the surface part, that is, no Cr-deficient layer exists, would be established by removing a surface layer part having a depth of 40 nm or more from the surface.

In contrast, in Working Example (with surface layer part removal), it is seen that no Cr-deficient layer exists within a region having a depth of 10 nm or more from the surface. Furthermore, a sufficiently large Cr ratio was detected even at a depth of 2 nm, which means that no Cr-deficient layer exists even substantially at the surface. That is, it can be said that the Cr ratio is kept almost constant as the position goes deeper from the surface. It has thus been found that in Working Example almost no Cr-deficient layer occurs and high corrosion resistance can be secured because Cr exists adjacent to the surface.

The present application is based on Japanese Patent Application No. 2016-030498 filed on Feb. 19, 2016, the contents of which are incorporated herein by reference.

DESCRIPTION OF REFERENCE NUMERALS AND SIGNS 1, 10: Rolling bearing
2, 12: Outer ring
3, 13: Inner ring
4, 14: Rolling body
5, 15: Holding device
16: Sealing member

The invention claimed is:

1. A method for manufacturing a rolling-sliding member, wherein the rolling-sliding member is an outer ring of a rolling bearing, the outer ring having an outer circumferential surface, an inner surface and side surfaces on each side of the outer ring between the outer circumferential surface and the inner surface, the method comprising:
  performing vacuum heat treatment, to attain hardness of 55 HRC or higher, on the outer ring of the rolling bearing, the outer ring being comprised of:
  0.15 mass % or larger and smaller than 0.70 mass % of C;
  0.05 to 1.00 mass % of Si;
  0.05 to 1.00 mass % of Mn;
  0.03 mass % or smaller of P;
  0.03 mass % or smaller of S;
  0.001 to 0.500 mass % of Cu;
  0.05 to 0.50 mass % of Ni;
  11 to 18.0 mass % of Cr;
  0.05 to 2.00 mass % of Mo;
  0.01 to 0.50 mass % of W;
  0.01 to 0.50 mass % of V;
  0.05 to 0.40 mass % of N;
  0.02 mass % or smaller of O;
  0.080 mass % or smaller of Al;
  0.0005 to 0.0050 mass % of B;
    provided that the total content of C and N is larger than 0.4 mass % and smaller than 0.7 mass %, and a content ratio C/N is 0.75 or larger; and
    the remainder being Fe and unavoidable impurities;
  wherein the vacuum heat treatment forms a Cr-deficient layer in a surface layer part of the outer ring of the rolling bearing; and
  thereafter performing processing of removing the surface layer part of the outer circumferential surface and the side surfaces of the outer ring of the rolling bearing such that no Cr-deficient layer exists on the outer circumferential surface and the side surfaces of the outer ring of the rolling bearing, but a Cr-deficient layer exists on the inner surface of the outer ring of the rolling bearing.

2. The method for manufacturing a rolling-sliding member according to claim 1, wherein a region of performing the processing of removing the surface layer part is a region having a depth of at least 40 nm from the outer circumferential surface and the side surfaces of the outer ring of the rolling bearing.

* * * * *